United States Patent [19]

Aggour et al.

[11] Patent Number: 4,574,837

[45] Date of Patent: Mar. 11, 1986

[54] METHOD AND APPARATUS FOR SPLITTING TWO-PHASE GAS-LIQUID FLOWS HAVING A KNOWN FLOW PROFILE

[75] Inventors: Mohamed A. Aggour, Kingwood, Tex.; Frans Greebe, Calgary, Canada

[73] Assignee: Exxon Production Research Co., Houston, Tex.

[21] Appl. No.: 536,940

[22] Filed: Sep. 29, 1983

[51] Int. Cl.⁴ ............................................. F16L 41/08
[52] U.S. Cl. .................................... 137/561 A; 138/37
[58] Field of Search ............... 137/561 A, 625.3, 887, 137/8, 9, 154, 171; 251/118; 406/55, , 81; 55/263, 307, 349; 166/303; 138/37, 39

[56] References Cited

U.S. PATENT DOCUMENTS

| 3,165,166 | 1/1965 | Hall . | |
|---|---|---|---|
| 3,349,803 | 10/1967 | Bourgeois | 138/37 |
| 3,954,428 | 5/1976 | Marple et al. | 55/307 X |
| 3,971,573 | 7/1976 | Clements | 285/150 X |
| 3,986,240 | 10/1976 | Shinner | 285/156 X |
| 3,986,558 | 10/1976 | Dufour | 166/303 |
| 4,134,425 | 1/1979 | Gussefeld et al. | 137/625.3 |
| 4,160,652 | 7/1979 | Martin et al. . | |
| 4,318,368 | 3/1982 | Carson et al. | 55/344 X |
| 4,319,608 | 3/1982 | Raikov et al. . | |
| 4,396,063 | 11/1981 | Godbey | 166/64 X |

FOREIGN PATENT DOCUMENTS 3032984 of 1980 Fed. Rep. of Germany ........ 138/37

Primary Examiner—A. Michael Chambers
Assistant Examiner—John C. Fox
Attorney, Agent, or Firm—David H. Vickrey

[57] ABSTRACT

A method and apparatus for diverting a portion of a two-phase fluid from a trunk pipeline, having a known flow profile, into a branch pipeline while maintaining substantially equal quality in both pipelines. Openings are placed in the trunk pipeline wall such that fluid samples which approximate the flow profile are withdrawn through the openings. The withdrawn fluid is collected in an enclosed chamber and transported through the branch pipeline.

8 Claims, 5 Drawing Figures

METHOD AND APPARATUS FOR SPLITTING TWO-PHASE GAS-LIQUID FLOWS HAVING A KNOWN FLOW PROFILE

FIELD OF INVENTION

This invention relates to a method and apparatus for splitting a two-phase fluid flowing with a known flow profile in a pipeline. In particular, this invention relates to a method and apparatus for removing a portion of a steam-liquid water stream from a trunk pipeline into a branch pipeline while maintaining substantially equal quality in both pipelines.

DESCRIPTION OF THE PRIOR ART

Pipe tees are extensively used in pipeline networks to transport fluid mixtures having two phases. Common industrial practices require the transportation of two-phase fluid mixtures of gas and liquid. A persisting problem in splitting the flow of a fluid which has both gas and liquid components is a change in quality of the fluid at the point of separation. The quality of a two-phase fluid is defined as the ratio of the mass of a gas component to the total mass of all gas and liquid components. Splitting a two-phase fluid stream from a trunk line into a branch line at a conventional pipe tee usually changes the quality of the two continuing streams. In fact, the quality of the various downstream branch flow streams in networks transporting two-phase fluids is often drastically changed, causing operation in unintended flow regimes.

A related problem has been observed in natural gas transmission networks. Frequently, liquid hydrocarbon condensates appear at some natural gas delivery stations while at other stations, the incoming natural gas remains relatively dry. Excessive condensate content can impair the operation of gas compressors in such networks, and a variety of complex schemes for completely separating gas from liquid have been proposed to solve this problem (see e.g., U.S. Pat. No. 4,160,652 (1979) to Martin, et. al). The requirement of complete phase separation, for example, to allow separated liquids to bypass a gas compressor, mandates that such schemes be complex and cumbersome.

These complex schemes are generally unsuitable solutions to the problems involved in diverting a portion of a flowing two-phase fluid where complete separation into gas and liquid components is neither necessary nor expedient. It is often desired that the flowing fluid contain substantially equivalent portions of gas and liquid. In such circumstances component separation is unnecessary. Flow-splitting problems have been particularly significant in oil field steam stimulation or flooding projects involving the transportation of wet steam from a common generator for injection into two or more wells. In such projects, subterranean reservoirs of viscous hydrocarbons are heated by injection of a steam-liquid water mixture. Even though proper quality steam is flowing out of the generator and through the trunk pipeline, wet steam delivery networks employing traditional pipe tees often fail to deliver steam of proper quality to some of the wells served by a common steam generator. Of particular concern in such situations are branch pipelines which deliver steam of a quality lower than the steam quality at the generator. Injection of low quality steam or hot liquid water is often ineffective for steam stimulation or flooding because sufficient heat cannot be transferred to the reservoir. This is because gaseous steam has a heat content much greater than that of liquid water at the same temperature. Thus, the large amount of latent heat released when steam is condensed in such a reservoir is unavailable when liquid water rather than steam is injected.

Several factors affect the difference in quality between the flow upstream and downstream from a pipe tee. The most important of these factors include the flow profile, the flow velocity, the angle between the incoming trunk line and the branch line, the orientation of the branch line relative to the horizontal plane, and the ratio of the volume of incoming flow to that of flow diverted into the branch line.

The problems of maintaining approximately constant quality when two-phase flow is split at a pipe tee have been recognized, but the proposed solutions are too restrictive. Frequently, these prior solutions require fixed relative flow rates in combination with fixed relative orientation of main trunk line and branch line, for example, constraining the flow system to the horizontal plane. Thus, it has been suggested in Hong, K. C., "Two-Phase Flow Splitting at a Pipe Tee", Journal of Petroleum Technology, vol. 30, no. 2, February 1978, pp. 290-296, that where all flow streams are horizontal in the vicinity of the tee, and where the incoming stream is perpendicular to both outgoing streams, and on the further condition that at leaat 15% of the flow is withdrawn in each downstream branch, the quality of steam flowing in the upstream and both downstream branches will be roughly equal.

Alternate proposed solutions for the case in which branch flow is diverted vertically upward from a horizontal trunk line have been suggested in Fouda, A. D. and Rhodes, E., "Two-Phase Annular Flow Stream Division in a Simple Tee", Transactions of the Institution of Chemical Engineers, vol. 52, 1974, pp. 354-360. The authors there suggest the insertion of a vertical baffle in the bottom of the trunk line opposite the branch line, or the positioning of a homogenising orifice in the trunk line immediately upstream from the branch line. This results in undesirable pressure losses.

Problems still exist with all prior art approaches for splitting two-phase fluid flow, in particular for splitting wet steam flow. On one hand, complete phase separation techniques (such as those for diversion of liquid condensates around gas compressors in natural gas pipelines) cannot feasibly be applied in general because they are very complex, cumbersome, and expensive. On the other hand, the simpler prior art solutions such as baffles or tee-orientation can be applied only in a limited class of wet steam splitting applications, and are much too restrictive in terms of tolerable relative flow rates and relative orientation of main trunk line and branch line.

SUMMARY OF THE INVENTION

The present invention is a method and apparatus for splitting a two-phase fluid flowing with a known flow profile while maintaining substantially the same quality throughout the distribution network. The distribution network consists of at least one main or trunk pipeline and at least one branch or take-off pipeline. The method employs a trunk pipeline which is perforated with openings in the wall of the pipeline. A portion of the two-phase fluid is allowed to pass through the openings in the pipeline wall. The removed fluid is accumulated in a collection chamber enclosing the perforated section of the trunk pipeline. The accumulated fluid flows from the collection chamber into a branch pipeline and is split from the fluid flowing in the trunk pipeline. In a preferred embodiment, the total area of the openings in the trunk pipeline wall is equal to the cross-sectional area of the branch pipeline.

DETAILED DESCRIPTION OF THE INVENTION

The method and apparatus of the present invention allow a two-phase fluid with a known flow profile flowing in a pipeline to be split from a trunk pipeline into a branch pipeline in a manner so as to maintain substantially equal quality in both pipelines. More particularly, the present invention provides a method and apparatus for use in a wet steam distribution network having a trunk pipeline and at least one branch or take-off pipeline, said method and apparatus employed to maintain steam of substantially equivalent quality in the trunk and all branch pipelines.

According to the present invention, branch pipeline quality substantially equivalent to trunk pipeline quality may be achieved by removing portions of the two-phase trunk pipeline fluid from a plurality of sampling ports in the trunk pipeline in a manner which immediately collects and combines those removed fluid portions to produce a quality substantially equivalent to the trunk pipeline quality. The method and apparatus of the present invention employ openings in the trunk pipeline which are designed to remove fluid samples which approximate the known cross-sectional phase distribution in the trunk pipeline. Upon removal from the trunk pipeline, the fluid samples are immediately collected and combined in a chamber surrounding the pipeline, and directed to the branch pipeline. The combined fluid samples flow into the branch line which has a quality substantially equal to that of the trunk pipeline.

Figure 1:
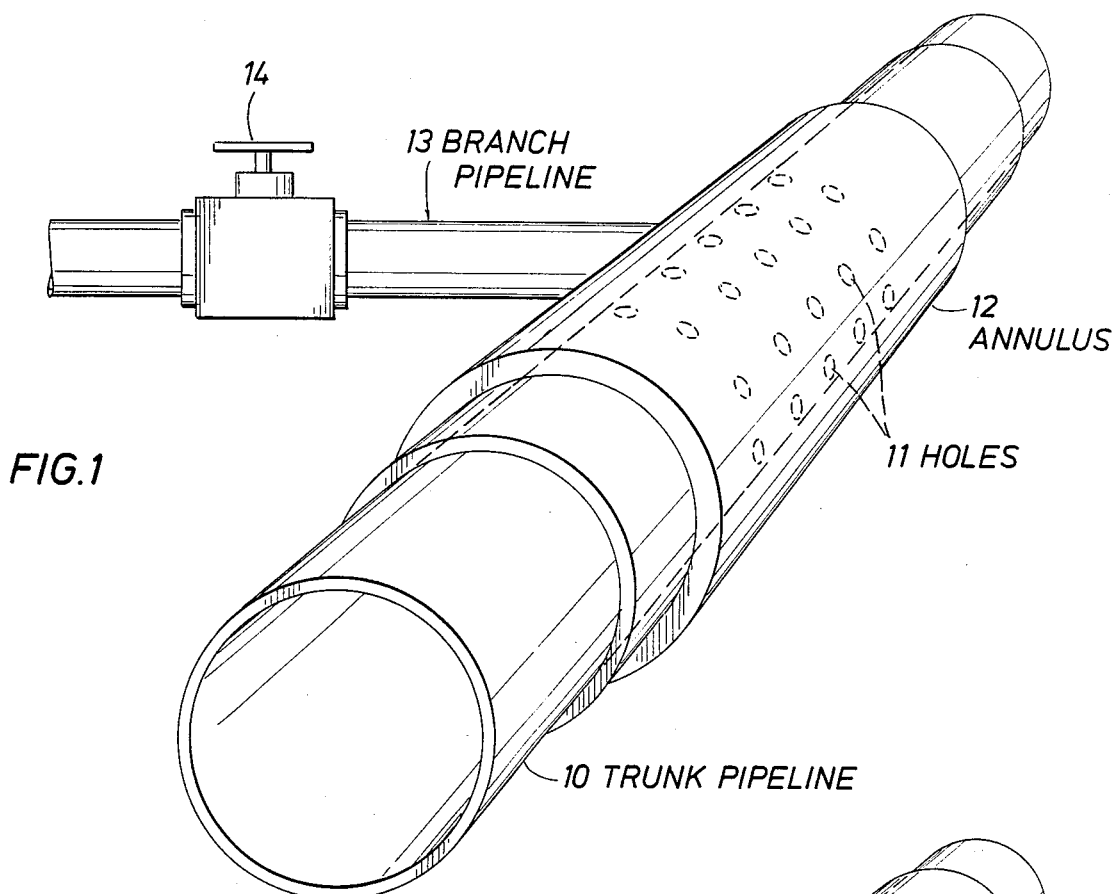
FIG. 1 schematically illustrates a preferred embodiment of the two-phase flow splitter of the present invention employing circular openings in the trunk pipeline wall.

Referring to FIG. 1, the two-phase gas-liquid fluid mixture flows through the trunk pipeline 10 to openings 11 in the trunk pipeline wall. Samples of the fluid flow through each of the openings 11. The withdrawn two-phase fluid portions are collected in the annular chamber 12 which encloses the openings. The annular chamber 12 and the trunk pipeline 10 must form an annulus of a size which is sufficient to collect and combine the two-phase fluid samples and will allow rapid removal of the collected fluid through the opening 11. Additionally, the annular chamber 12 must be long enough to enclose the openings 11 in the pipeline wall. The collected fluid passes from the enclosed annular chamber 12 into the branch pipeline 13. Control valve 14 may be used to regulate the amount of fluid removed from the trunk pipeline 10.

It has been discovered that the configuration of the openings 11 in the trunk pipeline wall 10 depends on three primary factors. These factors are (1) the flow profile in the trunk pipeline, (2) the orientation of the main trunk pipeline and (3) the liquid fraction in the trunk pipeline. Experimental results indicate that an arrangement of openings 11 which produces a split of substantially equal quality in an annular flow regime does not necessarily produce similar results in a slug flow regime. This shows that the configuration of openings for the method and apparatus of the present invention is dependent on the flow profile. Additionally, if the trunk pipeline 10 is vertical, substantially equal spacing between individual openings and substantially equal cross-sectional areas of individual openings will produce a representative sampling of the fluid in the trunk pipeline 10. However, if the trunk pipeline 10 is horizontal, gravity causes more liquid to flow in the bottom half of the trunk pipeline than in the top half. This is due to the difference between the density of liquid and the density of gas. If there are equal openings in the top and bottom of a horizontal trunk pipeline 10, an excess amount of liquid will be removed through the bottom openings. To compensate for this effect, the number or size (or both variables) of the individual openings on the top of the trunk pipeline 10 must be increased. Gravity will also affect the flow profile in a trunk pipeline which is neither vertical nor horizontal. In such pipeline transportation schemes, the distribution and total area of the openings required to produce substantially equivalent quality must be experimentally determined.

Figure 5:
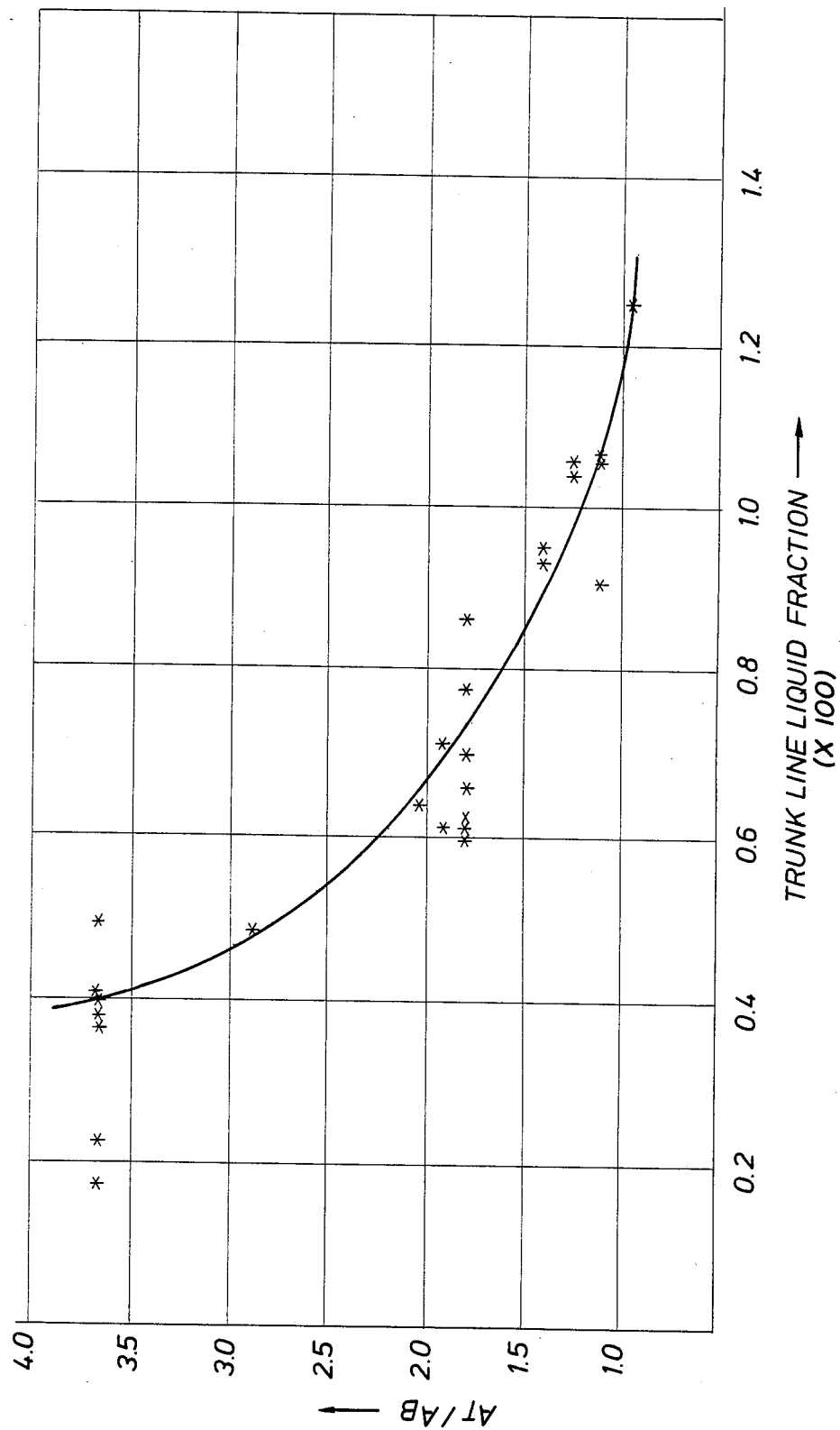
FIG. 5 is a plot of the ratio of the area of openings in the top of a horizontal trunk pipeline to the area of openings in the bottom of the trunk pipeline which produces quality in the branch pipeline substantially equivalent to quality in the trunk pipeline versus the liquid fraction in the trunk pipeline.

The effect of the trunk line liquid fraction on the ratio of the area of openings on the top of a horizontal trunk pipeline to the area of openings on the bottom ($A_T/A_B$) required to achieve substantially equivalent quality in the branch and trunk pipeline is illustrated by FIG. 5. As shown in FIG. 5, as the trunk pipeline liquid fraction increases the ratio $A_T/A_B$ decreases to approximately 1, meaning the total opening area on the top of the horizontal trunk pipeline is substantially equal to the total opening area on the bottom.

It has also been found that the amount of trunk pipeline fluid which may be diverted into branch pipeline 12 is limited by the total area of the openings 11. Maximum removal for a given branch pipeline diameter is possible when the total area of the openings 11 is equal to the cross-sectional area of the branch line 13.

EXAMPLE 1

The following example is designed to illustrate the characteristics of the present invention. An experimental apparatus was built in accordance with the present invention. The experimental apparatus is shown in FIG. 1. As shown, $\frac{1}{8}''$ diameter circular openings were made in a horizontal 2'' I.D. trunk pipeline. The openings were distributed circumferentially about the longitudinal axis of the trunk pipeline. The number of openings through the trunk pipeline wall was established by determining the openings required to give a total opening area substantially equal to the cross-sectional area of the branch pipeline. This permitted maximum fluid flow through the branch pipeline. The trunk pipeline was horizontal. Therefore, more openings were placed on the upper half of the pipeline than on the lower half to compensate for the effects of gravity on the annular flow profile. The ratio of the total opening area on top of the trunk pipeline to the total opening area on the bottom ($A_T/A_B$) was 1.52. A fixed, enclosed annular collection chamber 4" in diameter was placed around the openings to collect the fluid. A 4" diameter chamber was chosen to allow room for withdrawal of the fluids from the trunk pipeline and their immediate removal from the chamber through the branch pipeline. A 1" I.D. horizontal branch pipeline removed collected fluid from the chamber. A control valve was placed in the branch pipeline to regulate the amount of fluid removed.

A series of air-water mixtures having annular flow profiles was transported through the above-described trunk pipeline. An air-water mixture was used because it is safer and less expensive than wet steam. An air-water mixture is an appropriate model for testing application to other fluids since the flow profile is substantially independent of fluid properties. ("Effect of the Gas-Phase Density on Flow Pattern and Frictional Pressure Drop in Two-Phase, Two-Component Vertical Flow" M. A. Aggour and G. E. Sims, Proceedings of the Third Multi Phase Flow and Heat Transfer Symposium, Miami, Fla., 1983.) Portions of the air-water mixture were removed through the apparatus of the present invention and transported through the branch pipeline. The volume of flow diverted into the branch pipeline was varied within the range of 10% to 25% of the total volume of the air-water mixture flowing in the trunk pipeline. The test range of 10% to 25% flow diversion into the branch pipeline was determined by physical limitations of the experimental apparatus. A 10% flow diversion resulted from a heavily throttled branch pipeline flow; that is, the branch pipeline control valve was only slightly opened. A 25% flow diversion resulted from maximum flow through the branch pipeline. Tests similar to those performed with the experimental apparatus were performed with flow diversion accomplished by employing a conventional pipe tee.

Figure 2:
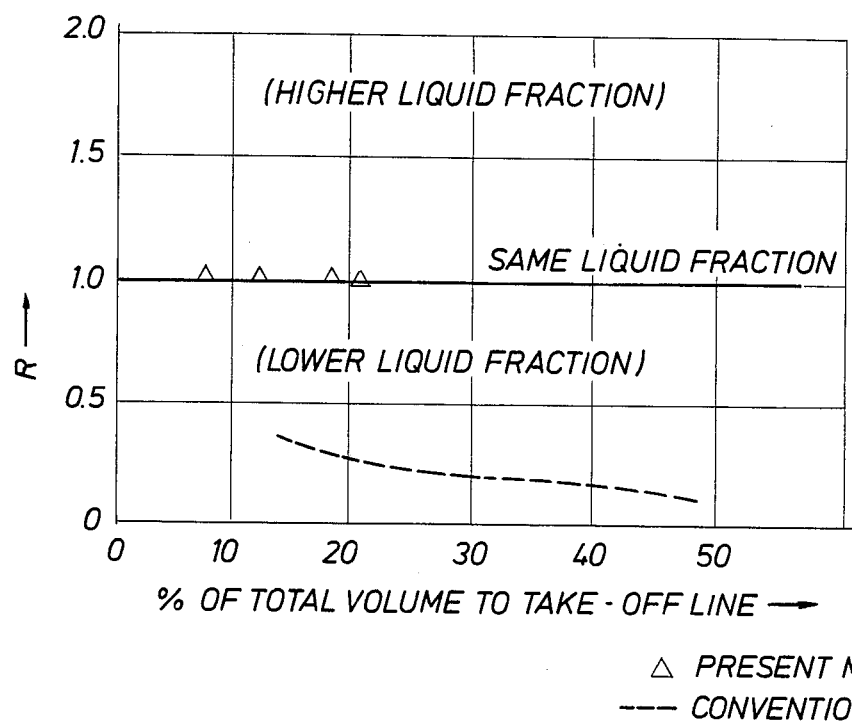
FIG. 2 is a plot of the percent of the total volume of a two-phase fluid diverted into a branch line versus the ratio of the liquid fraction in the branch line to the liquid fraction in the trunk line for both a conventional tee and for the apparatus of the present invention employing circular openings in the trunk pipeline wall.

The experimental results of splitting an annular two-phase flow by the method and apparatus of the present invention are plotted in FIG. 2. Also plotted in FIG. 2 are the results of splitting a two-phase flow by use of a conventional pipe tee. In FIG. 2, R is defined as the ratio of the liquid fraction in the branch pipeline to the liquid fraction in the trunk pipeline. With this definition, an R value of 1 indicates that the quality in the trunk pipeline and the branch pipeline are equivalent. As shown by FIG. 2, an R value of less than 0.4 occurs when a two-phase fluid is split by a conventional pipe tee. However, diverting a two-phase fluid stream into a branch pipeline by the method and apparatus of the present invention produces an R value substantially equal to 1. This shows that the fluid quality in the branch pipeline is substantially equal to the fluid quality in the trunk pipeline.

A maximum flow diversion into the branch pipeline of 25% was achieved with the present experimental apparatus. This flow limitation was a result of the cross-sectional area of the branch pipeline in the experimental apparatus. Thus, to divert greater than 25% of the flow into the branch pipeline, a larger diameter branch line must be employed. Additionally, it may be necessary to increase the total area of the openings in the trunk pipeline to allow a sufficient flow rate from the trunk pipeline into a branch pipeline of increased diameter.

EXAMPLE 2

A series of air-water mixtures having annular flow profiles was diverted through an experimental apparatus identical to the apparatus of Example 1 except the circular openings in the trunk pipeline were ¼" in diameter. Results similar to those plotted in FIG. 2 were obtained.

EXAMPLE 3

A series of air-water mixtures having slug flow profiles was diverted through experimental apparatuses identical to those of both Examples 1 and 2 except the ratio $A_T/A_B$ was 0.3. Results similar to those plotted in FIG. 2 were obtained.

EXAMPLE 4

An air-water mixture was diverted through an experimental apparatus identical to the apparatus of Example 1 except the annular collection chamber was decreased from a 4" diameter to a 3" diameter. R values of 1 for 10 to 25% flow diversions were achieved.

EXAMPLE 5

Figure 3:
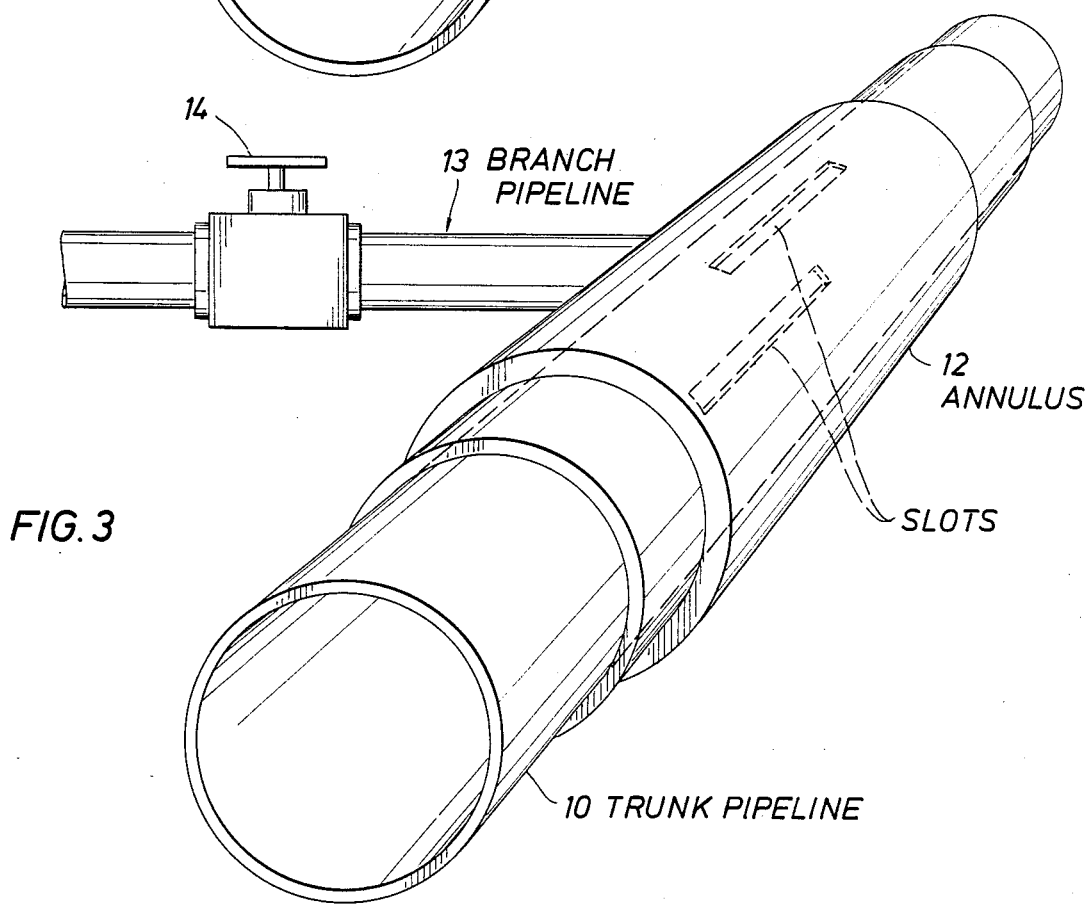
FIG. 3 schematically illustrates a preferred embodiment of the two-phase flow splitter of the present invention employing slotted openings in the trunk pipeline wall.

The following example is designed to illustrate a further embodiment of the present invention. An experimental apparatus was built in accordance with the present invention. The experimental apparatus is illustrated in FIG. 3. An upper slot and a lower slot were made in a horizontal 2" I.D. trunk pipeline. The two slots were aligned substantially vertically. Tees tested had upper slots ranging from 80 mm to 93 mm long. All upper slots tested were 6 mm wide. Tees tested had bottom slots ranging from 51 mm to 81 mm long and 2.25 mm to 7 mm wide. Also, since the trunk pipeline is horizontal, the area of the top slot was always larger than that of the bottom slot to compensate for gravity effects. The ratio of the area of the top slot to the bottom slot ($A_T/A_B$) ranged from 0.95 to 3.65. Values for $A_T/A_B$ within this range were tested because they produced substantially equal splitting at flow rates most important to the first expected application of the present invention. A fixed, enclosed annular collection chamber was placed around the openings to collect the fluid. A 1" I.D. horizontal branch pipeline removed collected fluid from the chamber.

As with the apparatuses described in Example 1, a series of air-water mixtures having annular flow profiles was transported through the slotted trunk pipeline. Portions of the air-water mixtures were removed through the apparatus of the present invention and transported through the branch pipeline. The volume of fluid diverted was between 7% and 25% of the total volume flowing in the trunk pipeline.

Figure 4:
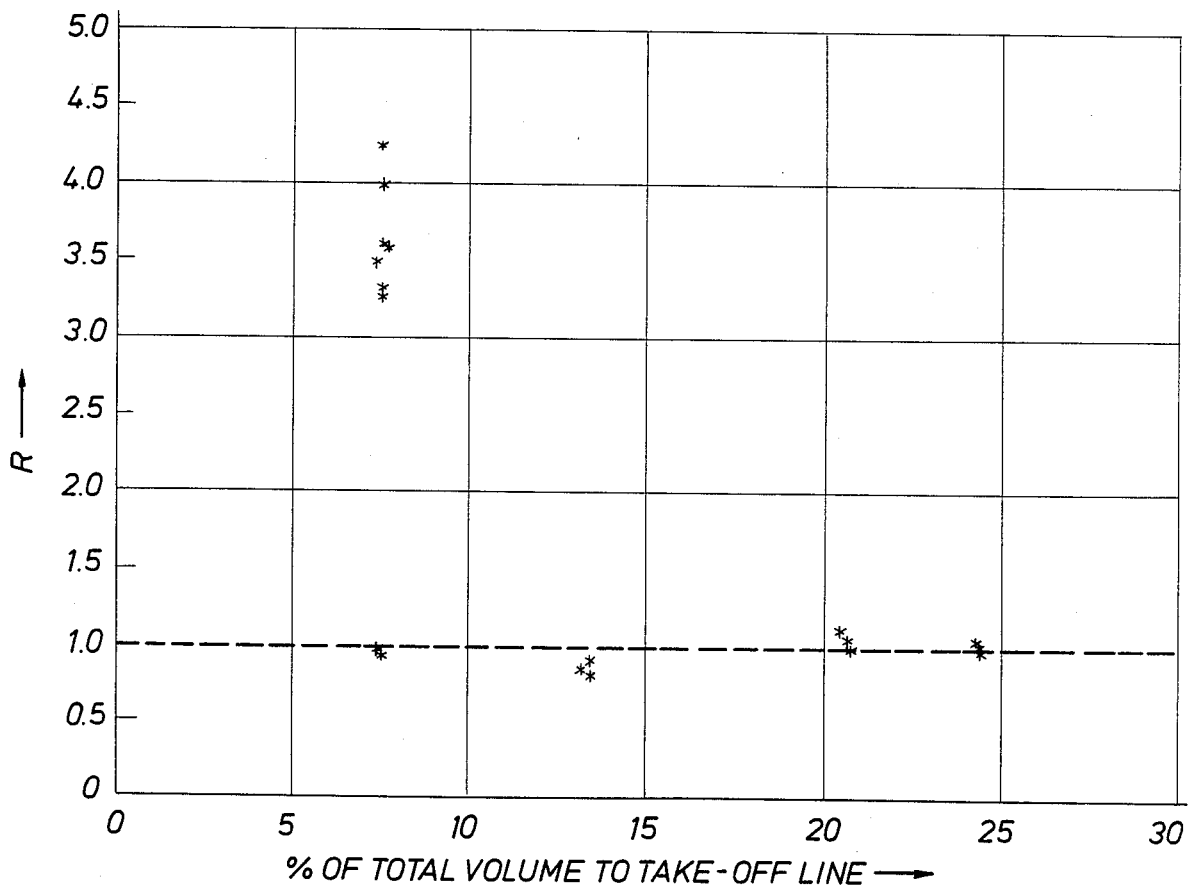
FIG. 4 is a plot of the percent of the total volume of a two-phase fluid diverted into a branch line versus the ratio of the liquid fraction in the branch line to the liquid fraction in the trunk line for the apparatus of the present invention employing slotted openings in the trunk pipeline wall.

Representative experimental results of splitting a two-phase flow by the method and apparatus of the present invention are plotted in FIG. 4. The ratio $A_T/A_B$ for the results plotted in FIG. 4 was 3.65. In FIG. 4, R is the ratio of liquid fractions as previously defined. Over the range tested, use of slots in the apparatus of the present invention produced an R value substantially equal to 1 when the amount of fluid diverted was greater than or equal to about 7%. Below 7%, a back pressure developed in the branch pipeline and disturbed the flow and the flow profile. Again, this R value of 1 shows the quality in the branch pipeline to be substantially equal to the quality in the trunk pipeline.

Thus, the present invention provides a method and apparatus for diverting a portion of a two-phase fluid having a known flow profile from a trunk pipeline into a branch pipeline while maintaining substantially equal quality in both pipelines. The present invention accomplishes such flow diversion without a phase separation step, without fixing relative flow rates in trunk and branch pipelines and independent of the relative orientation of trunk and branch pipelines.

Various modifications and alterations in the practice of this invention will be apparent to those skilled in the art without departing from the scope and spirit of this invention. Although the invention was described in connection with a specific preferred embodiment, it should be understood that the invention as claimed should not be unduly limited to such specific embodiment.

We claim:

1. An apparatus for diverting a stream of a flowing fluid into a branch pipeline from a substantially horizontal trunk pipeline having an upper wall and a lower wall, while maintaining quality in said branch pipeline substantially equal to quality in said trunk pipeline, said fluid comprising two fluid phases and having a known flow profile, the apparatus which comprises:
   (a) a section in said trunk pipeline having a first plurality of apertures through said upper wall of said trunk pipeline and a second plurality of apertures through said lower wall of said trunk pipeline, said apertures being sized and spaced circumferentially about said pipeline based upon said known flow profile, said first plurality of apertures having a total cross-sectional area greater than the total cross-sectional area of said second plurality of apertures;
   (b) a housing surrounding said section to form an annular chamber; and
   (c) a conduit attached to said housing to allow fluid to flow from said chamber into said branch pipeline.

2. The apparatus of claim 1 wherein said apertures are perforations.

3. The apparatus of claim 1 wherein said apertures are slots.

4. An apparatus for diverting a stream of a flowing fluid into a branch pipeline from a substantially horizontal trunk pipeline having an upper wall and a lower wall, while maintaining quality in said branch pipeline substantially equal to quality in said trunk pipeline, said fluid comprising at least two fluid phases and having a known flow profile, the apparatus which comprises:
   (a) a section of said trunk pipeline having a first slot through the upper wall of said trunk pipeline and a second slot through the lower wall of said pipeline wall, each said slot allowing fluid to flow through the wall of said horizontal pipeline, said first slot having a cross-sectional area greater than said second slot; and
   (b) a housing surrounding said section to form an annular chamber and enclose said first and second slots, said housing having a conduit attached to said housing to allow fluid to flow into said branch pipeline.

5. A method for diverting a stream of wet steam from a trunk pipeline into a branch pipeline, while maintaining quality in said branch pipeline substantially equal to quality in said trunk pipeline, said fluid having a known flow profile, said method which comprises:
   (a) withdrawing a portion of said wet steam from said trunk pipeline through a plurality of apertures in the wall of said trunk pipeline said apertures being sized and spaced circumferentially about said pipeline based on said known flow profile;
   (b) collecting said portion in an annular chamber which surrounds said apertures; and
   (c) withdrawing said portion from said annular chamber into said branch pipeline.

6. The method of claim 5 wherein said apertures are perforations.

7. The method of claim 5 wherein said apertures are slots.

8. The method of claim 5 wherein the total area of said apertures is substantially equal to the cross-sectional area of said branch pipeline.

* * * * *